P. KOTZ.
AUTOMATIC STEERING DEVICE.
APPLICATION FILED MAY 25, 1916.
1,210,084.
Patented Dec. 26, 1916.
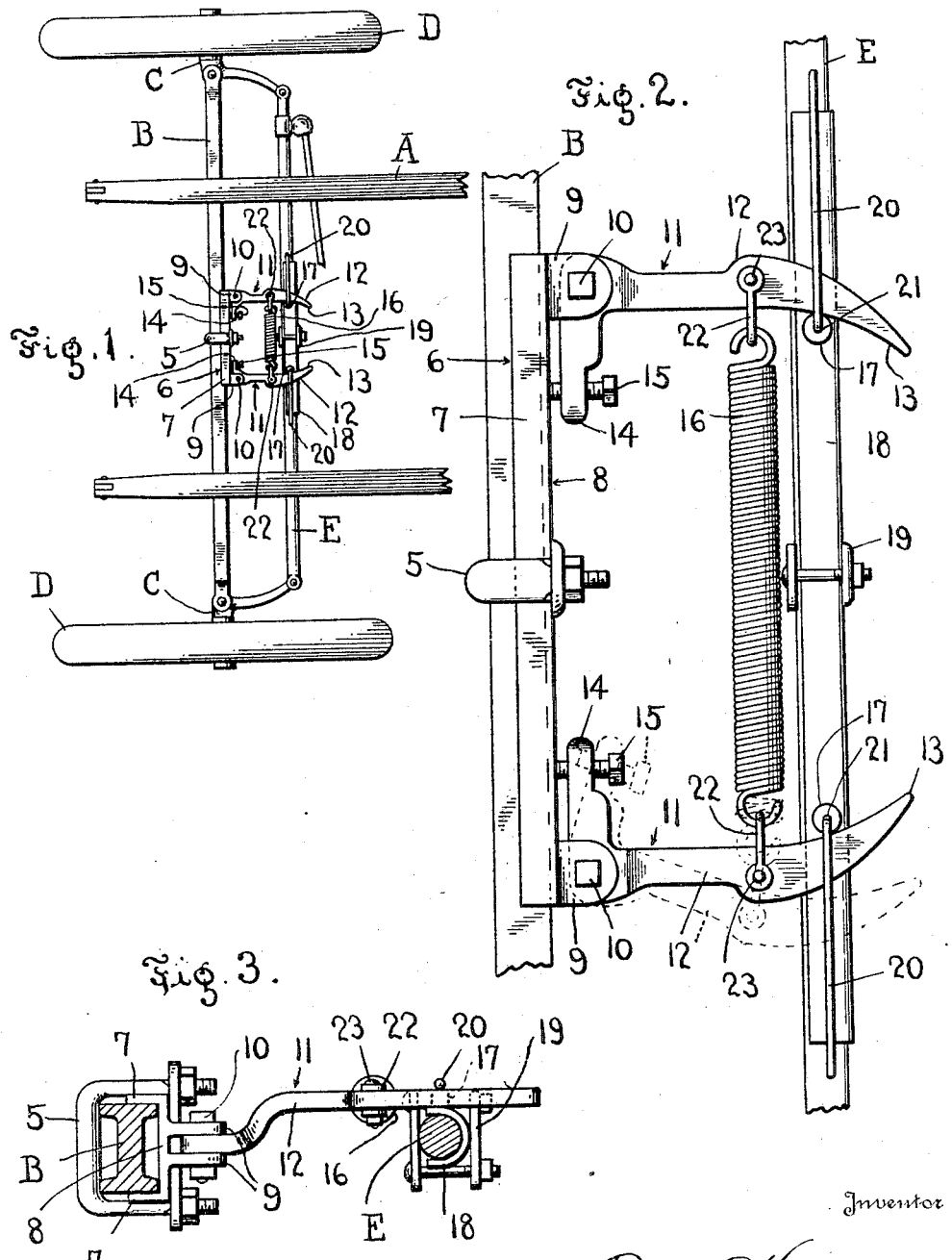
Inventor
Peter Kotz
By M. M. Cady,
Attorney

UNITED STATES PATENT OFFICE.

PETER KOTZ, OF WORTHINGTON, IOWA.

AUTOMATIC STEERING DEVICE.

1,210,084. Specification of Letters Patent. Patented Dec. 26, 1916.

Application filed May 25, 1916. Serial No. 99,891.

*To all whom it may concern:*

Be it known that I, PETER KOTZ, a citizen of the United States, residing at Worthington, in the county of Dubuque and State of Iowa, have invented certain new and useful Improvements in Automatic Steering Devices, of which the following is a specification.

This invention relates to automobile steering devices and more particularly to an automatic wheel controlling device.

The primary object of this invention resides in the provision of means whereby the tendency of the steering wheels of an automobile to turn out of alinement with the traction wheels is eliminated.

A further object of this invention resides in the provision of means whereby the steering wheels of an automobile are maintained in alinement with the traction wheels thereof should the controlling mechanism of the steering wheels be released by the operator.

In the accompanying drawings; Figure 1 is a plan view of the front portion of an automobile showing this invention applied in an operative position on the axle of the steering wheels; Fig. 2 is a similar view of this invention on an enlarged scale; Fig. 3 is a sectional view of the axle to the steering wheels of an automobile with this invention shown in side elevation.

Referring to the present embodiment of this invention, A designates the chassis of an automobile to which is secured an axle B. This axle B has pivotally secured thereto in the usual manner the steering knuckles C which carry the wheels D.

Secured to the axle B as by a clip 5 or other suitable fastening means is a channel bar 6 the sides 7 of which are adapted to bear against a portion of the upper and lower horizontal surfaces of said axle, while the web 8 thereof is adapted to engage the vertical surface at one side of said axle. Carried by the web 8 of said channel bar 6 are spaced ears 9 to which are pivoted as at 10, bell-crank levers 11, the longer arms 12 of which curve inwardly and extend as at 13 a considerable distance beyond the connecting rod E of the steering wheels D. The shorter arms 14 of these bell-crank levers 11 are also directed toward one another but lie in spaced relation to the aforesaid web 8 of the channel bar 6 and are provided with set-screws 15 which regulate the tension of the retractile spring 16 and govern the pressure of said arms 12 against the rollers 17 that are carried by a substantially semi-circular channel member 18 securely fastened to the connecting rod E by a suitable fastening clip 19.

In order that the aforesaid arms 12 of the bell-crank levers will be continuously retained in horizontal alinement with the rollers 17, guides 20 are secured to said semi-circular channel member 18 with their upstanding stems 21 forming trunnions upon which said rollers are rotated.

The above mentioned retractile spring 16 is utilized to retain said arms 12 of the bell-crank levers against the rollers 17, when the steering wheels are in alinement with the traction wheels, thus with the pressure of said spring tending to draw said arms 12 toward one another, it will be observed that as the wheels are turned in either direction one of the arms 12 is prevented from rocking since its adjusting screw bears against the web 8 of said channel bar, while the remaining arm 12 is rocked as its contacting roller is shifted laterally with the connecting rod E. During the shifting of either arm 12 as above stated, it will be observed that as one roller is operating to rotate its contacting arm, the other is moving away from its contacting arm and thus placing the strain of the retractile spring against the set-screw and web of the channel bar.

In order that the retractile spring will always have a direct pull between the longer arms of the bell-crank levers, clevises 22 are pivotally secured to said lever as at 23.

I claim:

1. A device of the character described comprising a channel bar fixed to the front axle of an automobile and surrounding a portion thereof, a channel member fixed to the connecting rod of the steering wheels of an automobile and surrounding a portion thereof, spaced ears carried by said channel bar and extending toward said connecting rod, spaced rollers carried by said channel member, bell-crank levers pivotally carried by said ears with their arms directed inwardly, adjusting screws carried by certain of said arms of the bell-crank levers and contacting with said channel bar, and a retractile spring connecting the other arms of said bell-crank levers.

2. A device of the character described, comprising a channel bar fixed to the front axle of an automobile, bell-crank levers pivoted to said channel bar, clevises carried by certain of said arms of said bell-crank levers, spaced rollers engaging the edges of said arms of the bell-crank levers, a retractile spring secured to said clevises, a channel member supporting said rollers, guards secured at one end to said channel member and projecting in spaced parallel relation thereto with their free ends terminating beyond those of said channel member, and adjusting means carried by the remaining arms of said bell-crank levers.

In testimony whereof I affix my signature in presence of two witnesses.

PETER KOTZ.

Witnesses:
M. M. CADY,
W. S. CLEWELL.

Copies of this patent may be obtained for five cents each, by addressing the "Commissioner of Patents, Washington, D C."